United States Patent
Raatschen et al.

(10) Patent No.: US 8,979,979 B2
(45) Date of Patent: Mar. 17, 2015

(54) METHOD AND DEVICE FOR REMOVING VOLATILE ORGANIC SUBSTANCES FROM THE CONTAINED AIR OF CLOSED HABITATS

(75) Inventors: Willigert Raatschen, Immenstaad (DE); Carsten Matthias, Friedrichshafen (DE); Helmut Westermann, Markdorf (DE)

(73) Assignee: Astrium GmbH, Taufkirchen (DE)

( * ) Notice: Subject to any disclaimer, the term of this patent is extended or adjusted under 35 U.S.C. 154(b) by 175 days.

(21) Appl. No.: 13/699,787
(22) PCT Filed: Apr. 29, 2011
(86) PCT No.: PCT/DE2011/000461
§ 371 (c)(1), (2), (4) Date: Jan. 14, 2013
(87) PCT Pub. No.: WO2011/147396
PCT Pub. Date: Dec. 1, 2011

(65) Prior Publication Data
US 2013/0104735 A1    May 2, 2013

(30) Foreign Application Priority Data
May 28, 2010   (DE) .......................... 10 2010 022 805

(51) Int. Cl.
   *B01D 53/04*   (2006.01)
   *A62B 7/14*    (2006.01)
   *A62B 23/00*   (2006.01)
(52) U.S. Cl.
   CPC .... *B01D 53/0462* (2013.01); *B01D 2259/4566* (2013.01); *B01D 2259/40096* (2013.01);
   (Continued)
(58) Field of Classification Search
   CPC .... A62B 23/00; B01D 53/04; B01D 53/0462; B01D 2253/108; B01D 2257/2066; B01D 2257/708; B01D 2258/06; B01D 2259/4009; B01D 2259/4508; B01D 2259/4558; B01D 2259/40096; B01D 2259/401; B01D 2259/4566; B01D 2259/4575

USPC ........ 96/126, 130, 143–146; 95/95, 106, 142, 95/148
See application file for complete search history.

(56) References Cited

U.S. PATENT DOCUMENTS 3,242,651 A    3/1966   Arnoldi
3,469,934 A *  9/1969   Bocard et al. ................. 423/220

(Continued)

FOREIGN PATENT DOCUMENTS

DE    196 53 964 A1    6/1998
DE    19653964 A1      6/1998

(Continued)

OTHER PUBLICATIONS

Kirk-Othmer, "Adsorption Processes", Encyclopedia of Chemical Technology, Fourth Edition, vol. 1, 1991, pp. 546-557 (cited in the German office action).

(Continued)

*Primary Examiner* — Frank Lawrence
(74) *Attorney, Agent, or Firm* — Posz Law Group, PLC

(57) ABSTRACT

A method for removing volatile organic substances from the contained air of closed habitats includes a) conducting contained air through an adsorber bed formed by a hydrophobic zeolite bed, b) closing the adsorber bed, c) extracting the air from the adsorber bed and feeding the air into the closed habitat, d) desorbing the volatile organic substances, in particular freons such as R134a and VOCs, from the adsorber bed by heating the adsorber, e) leading the desorbed substances to an environment outside the closed habitat, wherein water vapor, water, or $CO_2$ is fed to the adsorber bed through a flushing line. The device includes a housing for accommodating an adsorber, a contained-air supply line, a contained-air return line, a flushing line, and least one outlet-air line for returning air from the adsorber bed into the closed habitat and for conducting the desorbate to an environment outside the closed habitat.

14 Claims, 3 Drawing Sheets

(52) U.S. Cl.
CPC ........... *B01D2259/401* (2013.01); *A62B 23/00* (2013.01); *B01D 53/04* (2013.01); *B01D 2253/108* (2013.01); *B01D 2257/2066* (2013.01); *B01D 2257/708* (2013.01); *B01D 2258/06* (2013.01); *B01D 2259/4009* (2013.01); *B01D 2259/4508* (2013.01); *B01D 2259/4558* (2013.01)
USPC .................. 95/106; 95/142; 95/148; 96/144; 96/146

(56) References Cited

U.S. PATENT DOCUMENTS

| | | | |
|---|---|---|---|
| 3,507,051 A | | 4/1970 | Calvert et al. |
| 4,104,039 A | * | 8/1978 | Kuri et al. ........................ 95/98 |
| 5,110,328 A | * | 5/1992 | Yokota et al. .................. 96/112 |
| 5,300,468 A | * | 4/1994 | Senum et al. ................... 502/34 |
| 5,531,220 A | | 7/1996 | Cassidy |
| 6,605,132 B2 | | 8/2003 | Fielding |
| 7,951,228 B2 | | 5/2011 | Lemaitre et al. |
| 2010/0005958 A1 | | 1/2010 | Seki et al. |
| 2012/0004092 A1 | * | 1/2012 | Raatschen et al. ............. 502/55 |

FOREIGN PATENT DOCUMENTS

| | | |
|---|---|---|
| DE | 60032649 T2 | 11/2007 |
| EP | 0381942 A1 | 8/1990 |
| EP | 1535776 B1 | 12/2006 |
| FR | 2882662 A1 | 9/2006 |
| GB | 2275997 A | 9/1994 |
| WO | 2006/092525 A1 | 9/2006 |

OTHER PUBLICATIONS

International Search Report of the International Searching Authority mailed Nov. 2, 2011 for the corresponding international application No. PCT/DE2011/000461 (with English translation).

German office action issued from the German Patent Office mailed Nov. 4, 2010 for the corresponding German patent application No. 10 2010 022 805.2-43.

Office Action dated Nov. 18, 2013 issued in corresponding Australian patent application No. 2011257650.

Office Action dated Nov. 4, 2010 issued in corresponding DE patent application No. 10 2010 022 805.2-43 (Partial English translation only).

Office Action dated Apr. 13, 2012 issued in corresponding DE patent application No. 10 2010 022 805.2-43 (and Partial English translation).

International Preliminary Report on Patentability dated Dec. 4, 2012 issued in the corresponding International patent application No. PCT/DE2011/000461 (English translation only).

Cover letter from Korean associate regarding KR Office Action dated Apr. 4, 2014 issued in corresponding KR patent application No. 10 2012-7033753 (partial English translation from Korean associate only).

Office Action dated Nov. 19, 2014 issued in corresponding KR patent application No. 10-2012-7033753 (with partial English translation).

* cited by examiner

METHOD AND DEVICE FOR REMOVING VOLATILE ORGANIC SUBSTANCES FROM THE CONTAINED AIR OF CLOSED HABITATS

CROSS REFERENCE TO RELATED APPLICATIONS

This application is a U.S. national stage application of PCT/DE2011/000461 filed on Apr. 29, 2011, and claims priority to, and incorporates by reference, German patent application No. 10 2010 022 805.2 filed on May 28, 2010.

TECHNICAL FIELD

The invention relates to a method for removing volatile organic substances from the contained air of closed habitats, and also a device therefor.

BACKGROUND

In order to be able to offer healthy ambient conditions to the crew of closed habitats, e.g. submarines or space stations, the concentrations of volatile organic substances, also termed volatile organic compounds (VOCs) must be kept low. VOCs are usually formed by outgassing from materials, leaks, or by metabolic processes of the crew.

For air conditioning the contained air in closed habitats, usually refrigerants (e.g.,. R134a® (1,1,1,2-tetrafluoroethane)) are used as working medium in the cooling units, e.g. air conditioning units. Via leaks, the refrigerant can pass into the contained air. Also, owing to maintenance and repair work on the cooling units, refrigerant can pass into the contained air.

Usually, in closed habitats, activated carbon is used for binding harmful gases, in particular VOCs. However, R134a® (1,1,1,2-tetrafluoroethane) is a particularly stable molecule which, in addition, can only be adsorbed to activated carbon in very low amounts. The loading in usual contained air conditions around 25° C., 60% relative humidity and 1 bar is approximately 0.1% by weight. In known techniques for decomposing R134a® (1,1,1,2-tetrafluoroethane) catalytically at high temperatures and with input of energy, toxic gases, such as hydrogen fluoride, for example, are released, which themselves must be safely removed or bound.

U.S. Pat. No. 3,507,051 and EP 0 381 942 A1 disclose methods for regeneration of adsorbers. Kirk-Othmer: Encyclopedia of Chemical Technology, Fourth Edition, John Wiley Sons, New York 1991, Vol. 1, ISBN 0-471-52669-X, pp. 546-557 describes the principles of the temperature swing technique and also of the pressure swing technique.

Methods are certainly known for removing R134a (1,1,1, 2-tetrafluoroethane) from refrigeration units by suction, but here R134a® (1,1,1,2-tetrafluoroethane) is present in a virtually pure concentration. In the contained air in closed habitats, the R134a® (1,1,1,2-tetrafluoroethane) concentration, however, must be kept below the permissible limiting values (100-200 ppm). For this purpose no methods are known which bind R134a® (1,1,1,2-tetrafluoroethane) in a technically useful manner without large losses of air.

It is the object of the invention to provide a regenerative method with which volatile organic substances can be bound and removed from the contained air of closed habitats. A further object is the indication of a corresponding device.

SUMMARY

According to the invention, contained air from the closed habitat is passed through a suitable adsorber bed, a hydrophobic zeolite bed, wherein refrigerants (Freon® (halocarbons including chlorofluorocarbons), such as R134a® (1,1,1,2-tetrafluoroethane)) VOCs and air are embedded in the pore structure of the adsorber. The loading of the adsorber with the constituents of the contained air proceeds in a predetermined time interval, ex. between 2 and 15 hours. Subsequently, the adsorber bed is closed and the air situated in the pores and cavities is removed from the adsorber by suction. This air is fed back to the closed habitat. If this process of removal by suction takes place at room temperature, only small amounts of R134a® (1,1,1,2-tetrafluoroethane) and VOC are desorbed during the pressure reduction. In order to achieve desorption of the volatile organic substances from the adsorber bed, the adsorber bed is heated. The desorbate formed by the heating is fed to an environment outside the closed habitat.

In one variant of the invention, the adsorber bed is heated by electrical heating, or by heat exchangers connected to the adsorber bed. In this variant, the desorbate is removed by purging the adsorber with steam, water, $CO_2$, or other adequate purging gases.

In a second variant of the invention, the adsorber bed is heated by purging with steam at a temperature in a temperature interval of, e.g., 100° C. and 120° C.

Expediently, the desorbate is fed to a compressor which passes the desorbate into the environment outside the closed habitat. In the case of a submarine, there is, for example, in any case a compressor present in order to deliver the $CO_2$ filtered out of the contained air to the seawater. For the present invention, the compressor can thus likewise be used for disposal of the R134a® (1,1,1,2-tetrafluoroethane) and the other VOCs.

On board a space station, a $CO_2$ compressor is not absolutely necessary. Here, R134a® (1,1,1,2-tetrafluoroethane) and the other VOCs can be disposed of directly from the adsorber bed via the vacuum of space.

Loading tests have shown that there are adsorbers, such as zeolites, that have a higher binding for Freon (halocarbons including chlorofluorocarbons) than conventional activated carbons. In addition, the binding is dependent only to a limited extent on the humidity of the contained air. On account of the hydrophobicity, it is expedient to desorb such adsorbers with steam or heat, in order thereby to achieve a semi-continuous binding process.

The device, according to the invention, for removing volatile organic substances essentially comprises a housing for receiving an adsorber and also feed and return lines for contained air connected to the housing and also further lines connected to the housing such as, e.g., a feed line for a purging gas and an outlet line for the desorbate during the regeneration.

BRIEF DESCRIPTION OF THE DRAWINGS

The invention and advantageous embodiments of the invention will be described in more detail hereinafter with reference to drawings.

DETAILED DESCRIPTION

Figure 1:
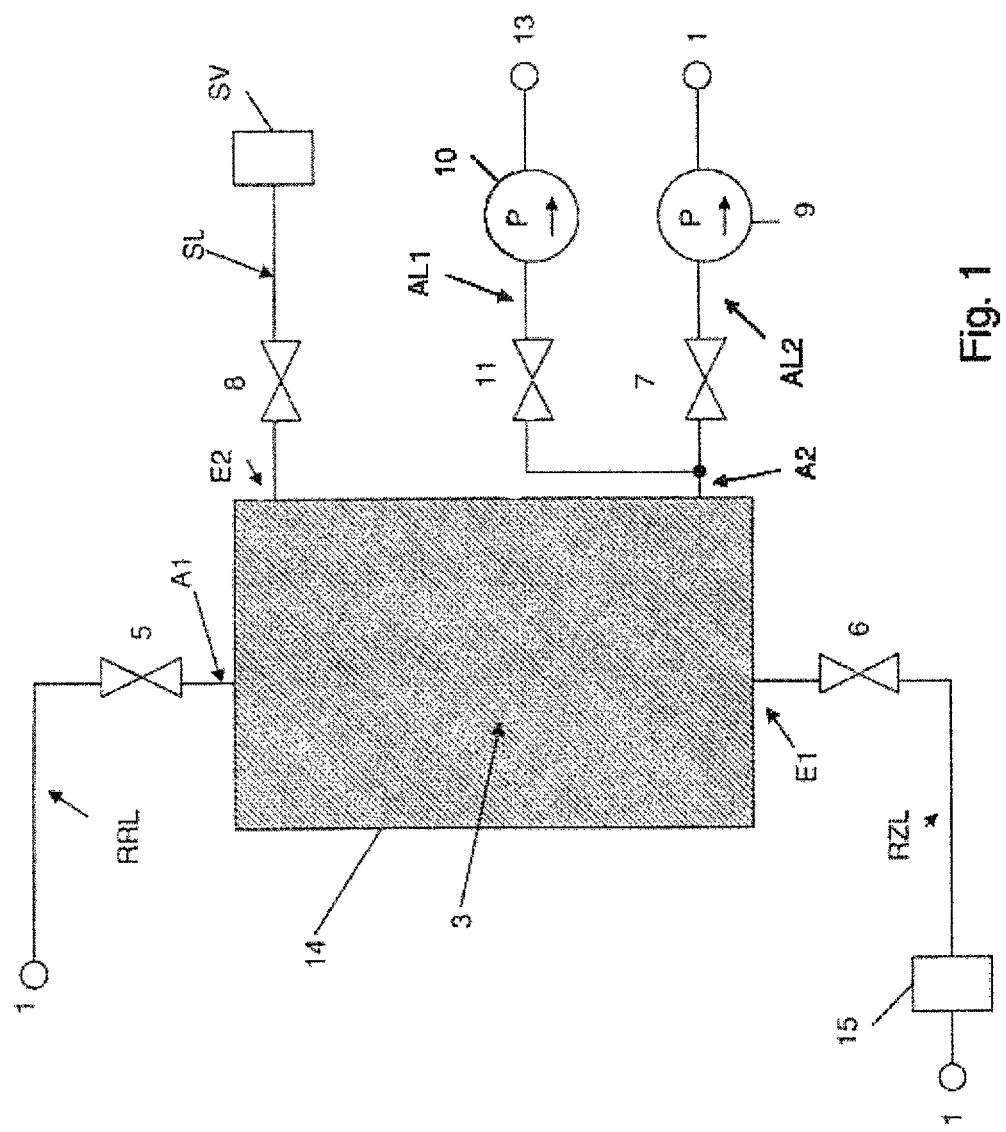
FIG. 1 is an exemplary schematic view of a first embodiment of the invention.

FIG. 1 shows a schematic depiction of a first embodiment of the invention. The adsorber 3 is situated within a housing 14. The housing 14 has a first intake E1, at which the contained air feed line RZL is connected. The contained air feed line RZL connects the interior of the closed habitat 1 to the adsorber 3. In the contained air feed line RZL, on the habitat side, a fan 15 is provided, and on the housing side a first valve 6 is provided.

The housing 14 has a first exit A1, at which a contained air return line RRL is connected. The contained air return line RRL connects the interior of the closed habitat 1 to the adsorber 3. In the contained air return line RRL, a second valve 5 is arranged.

During the adsorption, the ventilator 15 blows contained air from the habitat 1 via the open valve 6 through the adsorber 3. In the adsorber 3, e.g. R134a® (1,1,1,2-tetrafluoroethane) and also VOCs are adsorbed. The purified air then passes through the open valve 5 back into the habitat 1.

The housing 14 has a second exit A2 which is connected to a first outlet-air line AL1. This outlet-air line AL1 connects the adsorber 3 via a fourth valve 11 and a compressor 10 to an environment 13 outside the habitat 1. In this case, the fourth valve 11 is arranged in the outlet-air line on the housing side, and the compressor 10 on the environment side. Thus, it is ensured that, when valve 11 is open, desorbate from the adsorber 3 can be pumped through the valve 11 and by the compressor 10 to the environment 13. In this case the compressor 10, e.g. a $CO_2$ compressor, is only optional in the case of use of the device in a submarine. When the device is used in a space station, a compressor can be dispensed with. The desorbate can be removed from the adsorber 3 by the vacuum of space when valve 11 is open.

At the second exit A2, likewise a second outlet-air line AL2 is connected. This outlet-air line AL2 connects the adsorber 3 to the interior of the closed habitat. In the outlet-air line, a fifth valve 7 is connected on the housing side and a vacuum pump 9 is connected on the habitat side. When valve 7 is open and at the same time valve 11 is closed, the air that is situated in the adsorber bed 3 in the holes and cavities is removable by suction and fed to the interior of the habitat 1. It is thereby achieved in this manner that, in the recursive process of removal of, for example, R134a® (1,1,1,2-tetrafluoroethane) or VOCs, as little air as possible from the interior of the habitat 1 is fed to an environment 13 outside the habitat 1.

The housing 14 has a second intake E2 which is connected to a purging line SL. This purging line SL connects the adsorber 3 to a purging medium storage container SV via a third valve 8. Through the purging line SL, when valve 8 is open and valves 11 and 7 are closed, e.g. steam at a temperature of 100° C.-120° C. is passed into the adsorber bed 3. This means that the R134a® (1,1,1,2-tetrafluoroethane) or VOCs adsorbed in the adsorber 3 are desorbed. After a predetermined time, valve 11 is opened and the desorbate is delivered to the environment 13.

Figure 2:
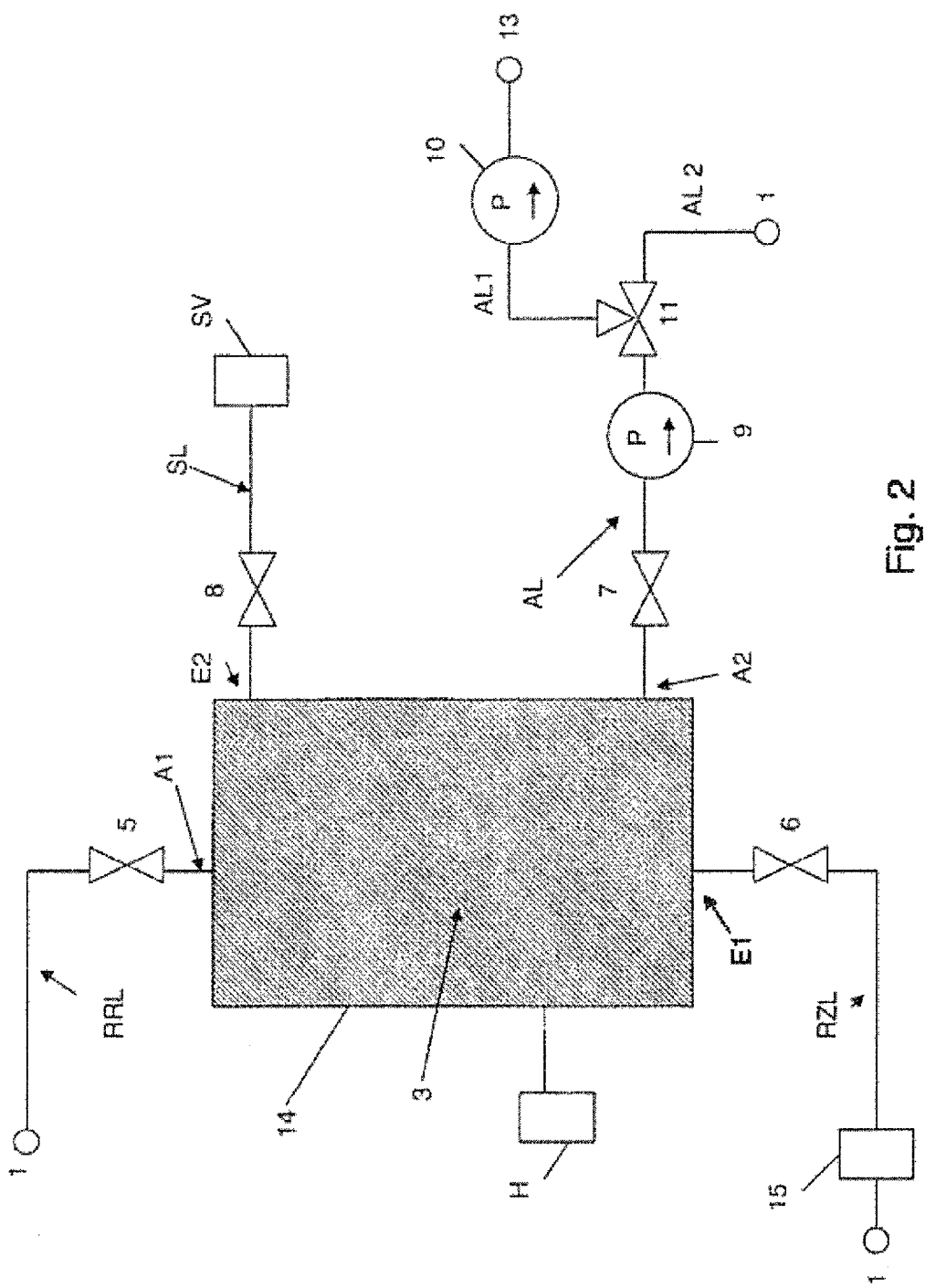
FIG. 2 is an exemplary schematic view of a second embodiment of the invention.

FIG. 2 shows a schematic depiction of a second embodiment of the invention. The descriptions with respect to the first intake E1, the second intake E2 and the first exit A1 correspond to those of the first embodiment.

The second embodiment has a heating unit H which is connected to the housing 14. This heating unit H can be, e.g., an electrical heater or a heat exchanger.

At the second exit A2 of the housing 14, an outlet-air line AL is connected. This outlet-air line connects the adsorber 3 via a three-way valve 11 on the one hand to the interior of the habitat 1 and on the other hand to the environment 13 outside the habitat 1. In the outlet-air line AL, on the housing side a fourth valve 7 is arranged and on the three-way valve side 11, a vacuum pump 9 is arranged.

The one exit of the three-way valve 11 is connected via a compressor 10 to the environment 13 outside the habitat 1. The other exit of the three-way valve 11 is connected to the interior of the habitat 1.

Figure 3:
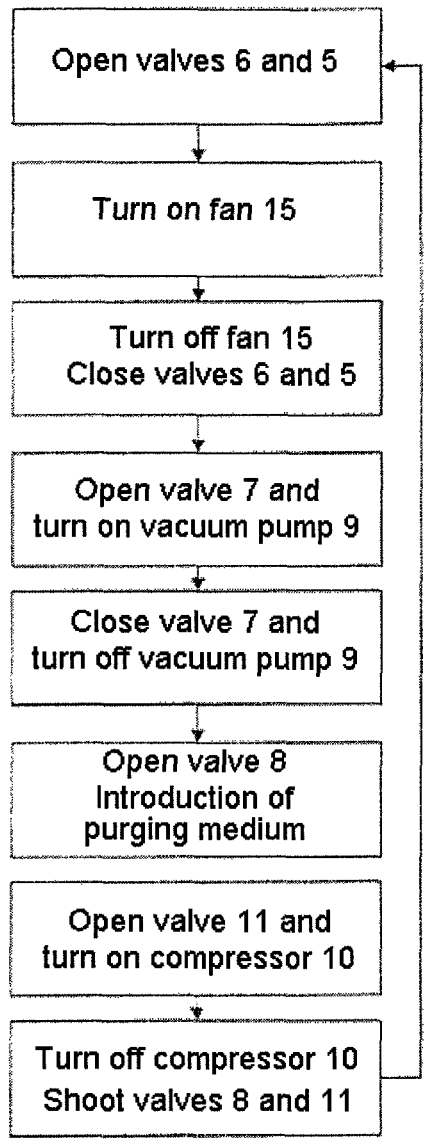
FIG. 3 is a flow diagram of the recursive method according to the invention as per the first embodiment.

FIG. 3 shows a flow diagram of the recursive method according to the invention as per the first embodiment.

In the starting position, all valves are closed.

First, in step 1, valves 6 and 5 in the contained air feed lines RZL or contained air return line RRL, respectively, are open. Subsequently, in step 2, a fan is turned on which passes contained air from the habitat 1 through the adsorber bed 3. Via the contained air return line RRL, the purified air is fed back to the interior of the habitat 1. The fan 15 remains turned on for a predetermined time, e.g. 2-15 hours.

After this time, in step 3, valves 6 and 5 are closed.

In step 4, valve 7 in the outlet-air line 2 AL2 is opened and a vacuum pump 9 is turned on. Using the vacuum pump 9, air is pumped from the cavities in the adsorber 3 back into the interior of the habitat 1.

Subsequently, in step 5, valve 7 is closed and the vacuum pump 9 is turned off.

In step 6, valve 8 in the purging line SL is opened and, from a purging medium storage container SV, at a temperature of above 100° C. is passed into the adsorber bed 3. The hot steam condenses at the start on the comparatively cold surface of the adsorber 3. By the heating of the adsorber 3, R134a® (1,1,1,2-tetrafluoroethane) and also VOCs are desorbed. After a predetermined time, in step 7 valve 11 in the outlet-air line AL1 is opened and optionally compressor 10 is turned on. The desorbate is passed thereby from the adsorber bed to the environment 13 outside the habitat 1.

Figure 4:
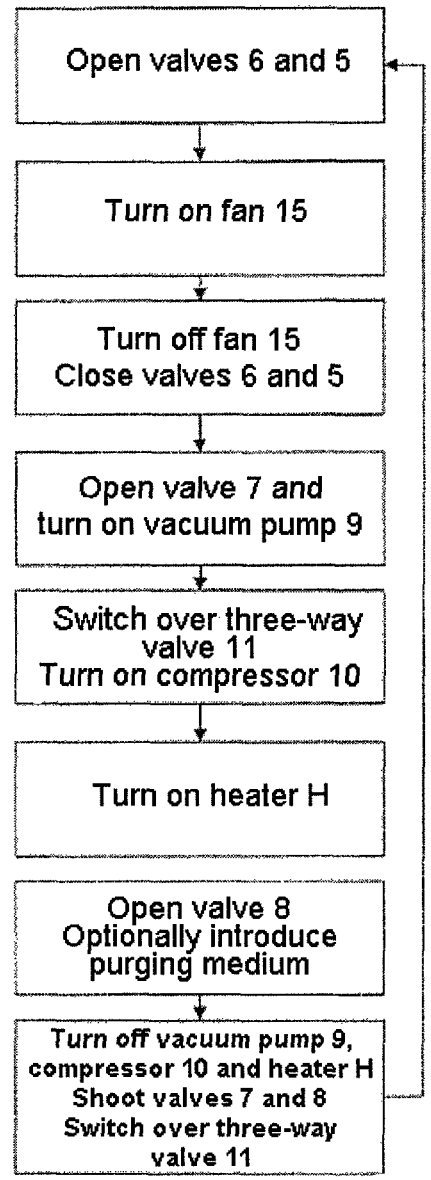
FIG. 4 is a flow diagram of the recursive method according to the invention as per the second embodiment.

FIG. 4 shows a flow diagram of the recursive method according to the invention as per the second embodiment. In the starting position, all valves are closed. The three-way valve 11 in this case is brought into the position such that the interior of the habitat 1 is connected to the vacuum pump 9.

Steps 1 to 4 correspond to steps 1 to 4 from FIG. 3. After a predetermined time, in step 5, the three-way valve 11 is switched over and optionally the compressor 10 is turned on, in such a manner that the desorbate gas is fed via the outlet-air line AL1 of the adsorber bed 3 via the compressor 10 to the environment 13 outside the habitat 1. In step 6, the heater H is turned on. As a result of the increasing temperature in the adsorber bed 3 at low pressure in the housing 14, R134a® (1,1,1,2-tetrafluoroethane) and VOCs are desorbed. The desorbate is fed via the outlet-air line AL 1 to the environment 13 outside the habitat 1.

The invention claimed is:

1. A method for removing volatile organic substances from the contained air of closed habitats, comprising the following steps:
   a) passing contained air through an adsorber bed consisting of a hydrophobic zeolite bed,
   b) closing the adsorber bed,
   c) removing the air from the adsorber bed by suction and feeding the air to the closed habitat after step b),
   d) desorbing the volatile organic substances, in particular halocarbons Freon and VOCs, from the adsorber bed by heating the adsorber,
   e) feeding the desorbate to an environment outside the closed habitat, wherein steam, water or $CO_2$ is fed to the adsorber bed via a purging line, and the desorbate is fed to a compressor which passes the desorbate to the environment outside the closed habitat.

2. The method as claimed in claim 1, wherein in step d), the adsorber is heated by electrical heating, or by heat exchangers connected to the adsorber bed, or by purging with hot steam, water or $CO_2$.

3. The method as claimed in claim 1, wherein, in step d), the desorption is additionally supported by pressure reduction in the housing.

4. The method as claimed in claim 1, wherein the adsorber material has a pore size which is favorable, in particular, for the binding and adsorption of 1,1,1,2-tetrafluoroethane or Freon.

5. A device for removing volatile organic substances from the contained air of closed habitats, comprising:
- a housing having a first intake, a second intake, a first exit and a second exit and an adsorber consisting of a hydrophobic zeolite bed;
- a contained air feed line having a first valve between the first intake and the closed habitat;
- a contained air return line having a second valve between the first exit and the closed habitat;
- a purging line having a third valve between a purging medium storage container and the second intake; and
- at least one outlet-air line at the second exit for returning air from the adsorber bed to the closed habitat and for discharging the desorbate to an environment outside the closed habitat;

wherein
  in the outlet-air line, seen from the direction of the second exit, a fourth valve, a vacuum pump and a three-way valve are arranged, and in that the one exit of the three-way valve is connected to the closed habitat and the other exit of the three-way valve is connected to the environment outside the closed habitat.

6. The device as claimed in claim 5, wherein a fan is arranged in the contained air feed line between the closed habitat and the first valve.

7. The device as claimed in claim 5, wherein the housing has a heating device.

8. The device as claimed in claim 7, wherein a compressor is present between the three-way valve and the environment.

9. The method as claimed in claim 2, wherein the adsorber material has a pore size which is favorable, in particular, for the binding and adsorption of 1,1,1,2-tetrafluoroethane or Freon.

10. The method as claimed in claim 3, wherein the adsorber material has a pore size which is favorable, in particular, for the binding and adsorption of 1,1,1,2-tetrafluoroethane or Freon.

11. The device as claimed in claim 6, wherein the housing has a heating device.

12. The device as claimed in claim 11, wherein a compressor is present between the three-way valve and the environment.

13. The device as claimed in claim 7, wherein the heating device is a heat exchanger or an electrical heater.

14. The device as claimed in claim 11, wherein the heating device is a heat exchanger or an electrical heater.

\* \* \* \* \*